Dec. 18, 1962 N. H. EDSTRÖM ETAL 3,069,502

COIN IDENTIFICATION AND SIGNALLING TELEPHONE DEVICE

Filed Oct. 30, 1958 2 Sheets-Sheet 1

INVENTORS.
NILS HERBERT EDSTRÖM
CARL-ERIK WILHELM HÄRLIN
KURT KATZEFF

BY Hane and Nydick

ATTORNEYS

Dec. 18, 1962 N. H. EDSTRÖM ET AL 3,069,502

COIN IDENTIFICATION AND SIGNALLING TELEPHONE DEVICE

Filed Oct. 30, 1958 2 Sheets-Sheet 2

INVENTORS
NILS HERBERT EDSTRÖM
CARL-ERIK WILHELM HÄRLIN
KURT KATZEFF
BY Hane and Nydick
ATTORNEYS

United States Patent Office 3,069,502
Patented Dec. 18, 1962

3,069,502
COIN IDENTIFICATION AND SIGNALLING TELEPHONE DEVICE

Nils Herbert Edström and Carl-Erik Wilhelm Härlin, Hagersten, and Kurt Katzeff, Bandhagen, Sweden, assignors to Telefonaktiebolaget L M Ericsson, Stockholm, Sweden, a corporation of Sweden Filed Oct. 30, 1958, Ser. No. 770,780
Claims priority, application Sweden Nov. 6, 1957
4 Claims. (Cl. 179—6.3)

The present invention refers to a device for use in a coin operated telephone instrument for signalling by means of voice frequency alternating current signals the values of different coins from a coin instrument to a control device located in an automatic telephone exchange.

Telephone instruments for sending voice frequency alternating current signals to a receiver located in an automatic telephone exchange for operating a register in the exchange, are known before, for example from Swedish Patent 144,682 or 154,618. Such an instrument comprises generally an oscillating circuit having a capacitive part and an inductive part and in which short, damped oscillations can be produced by charging or discharging an energy accumulating impedance. A number of switches are connected to different terminals of the oscillating circuit so that when operating one of these switches, the oscillating circuit will be completed and said impedance will be inserted into the circuit. Thereby a damped oscillation corresponding to the switch operated will arise causing a voice frequency current through the line.

The fundamental idea of the present invention consists in using the voice frequency generator of the telephone instrument for signalling to a controlling device in a telephone exchange the values of different coins inserted into a coin box which is connected to the instrument, in order to define the allowed length of the conversation in dependence on the value of the coin inserted, and preventing that the sending of digits and the signalling of the coin values have any influence on each other.

The device according to the invention is substantially characterized by the fact that it comprises a coin box having a number of contacts which can be operated by the coins inserted into the coin box in order to transmit through the line a voice frequency signal corresponding to the value of the coin and comprising at least one voice frequency, by inserting distinct impedance elements into the oscillating circuit of the voice frequency generator, and means preventing that any impedance element is connected by the coin contacts during the digit sending and by the digit contacts during the coin value signalling.

Figure 1:
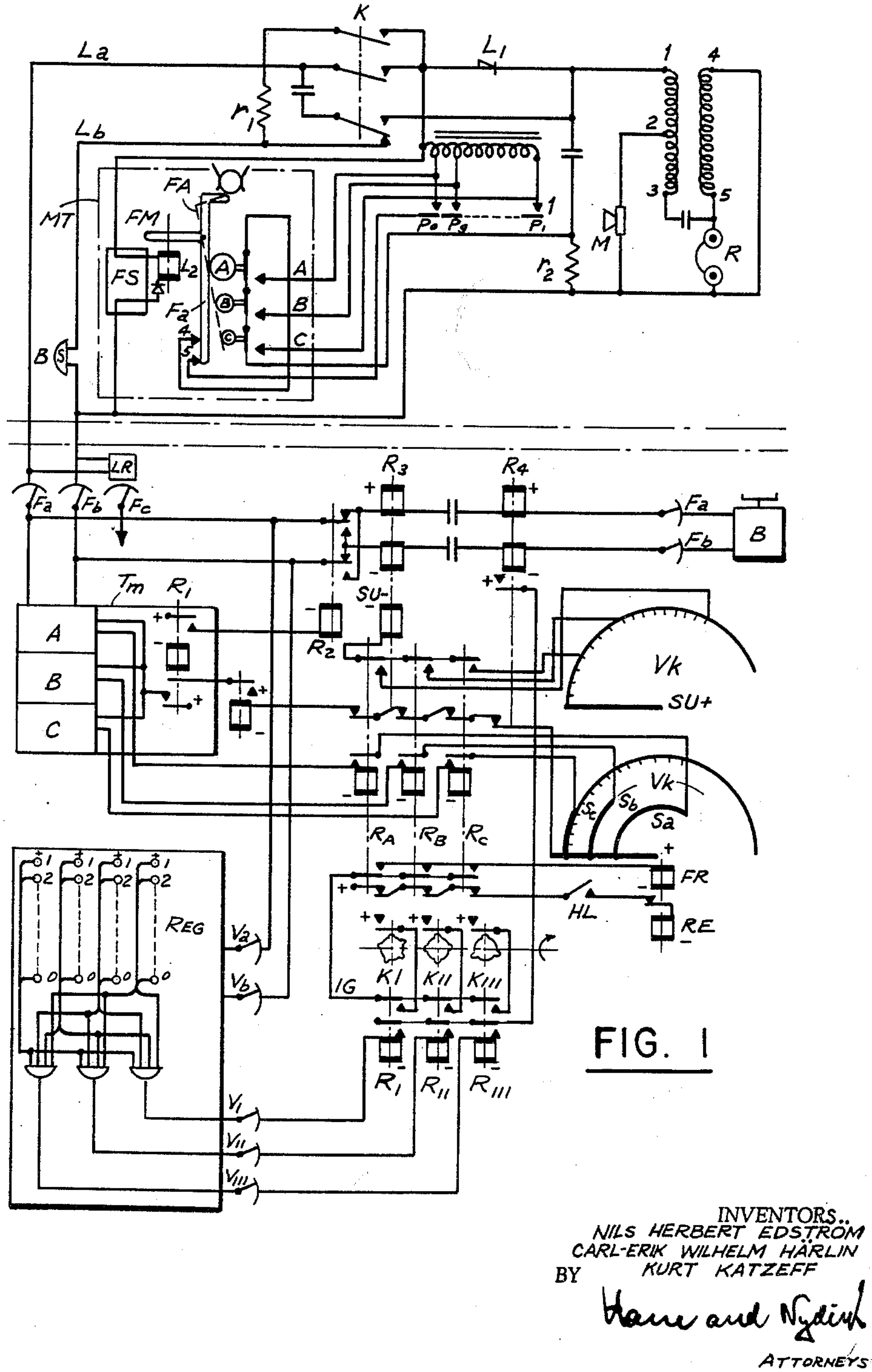
Figure 2:
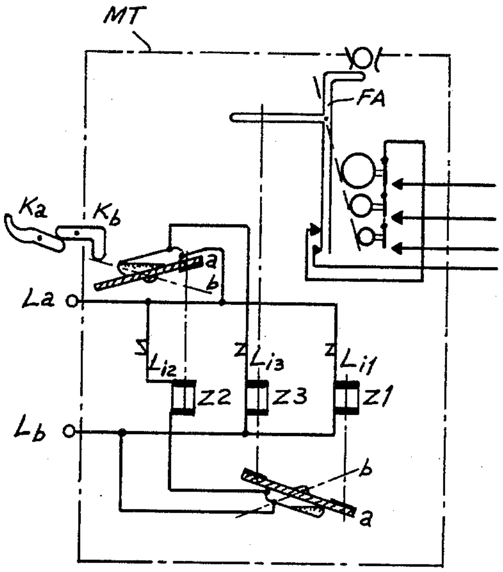
Figure 3:
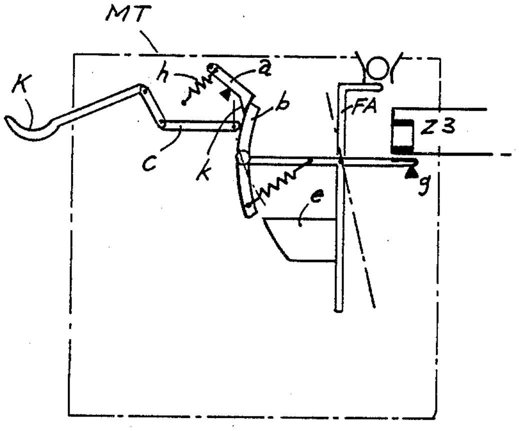

The invention will be explained more in detail with reference to the enclosed drawing by means of several embodiments. FIG. 1 is a circuit diagram for a circuit arrangement according to the invention, and FIGS. 2 and 3 show different stepping forward means for the coin progressing device of the coin box.

FIG. 1 shows a circuit diagram for a telephone instrument having means for transmitting voice frequency alternating current signals, a coin box MT connected to the telephone instrument IC in order to produce voice frequency alternating current signals corresponding to the values of the different coins, and means in the telephone exchange, necessary for the function of the arrangement. The telephone instrument comprises an inductance coil IC to which a microphone M and a receiver R are connected in a manner known per se. In idle condition the ringing bell B is connected through a capacitor C1 to the line L*a*, L*b*. When closing the cradle contact K a circuit is completed to the line equipment of LR of the subscriber in the exchange through the contact K2, rectifier L1, coil IC and microphone M. Thereby the polarity on the line is reversed through means arranged in the exchange as described in detail in Swedish Patent 154,618. As the rectifier L1 is blocking the current in this direction, the capacitor C1 will be charged. An inductance coil PC is provided with a number of terminals which are connected to ten contacts P1–P0. If one of the contacts is operated, a circuit will be completed comprising the capacitors C1, C3 and the portion of the inductance coil PC located at the left side of the push button. The energy stored in the capacitor C1 gives rise to a damped oscillation in said oscillating circuit, an alternating current is obtained across the capacitor C1 and causes a voice frequency alternating current through the line. When the called subscriber has answered, there will be a reversal of the line polarity again and the original polarity of the line will be restored as described in detail in said Swedish patent 154,618.

Of the coin box MT only such parts are shown on the drawing which have importance for explaining the invention. The mechanical construction, the coin control etc., do not differ from the means used in usual coin boxes. According to the embodiment the coin box is intended for use of three different types of coins A, B and C and is provided with three contacts each of which, when operated by a coin, can by its closing connect a distinct impedance element to the oscillating circuit. The coin box MT has a progressing magnet FM which is magnetized on polarity reversal from the exchange as will be explained later and which when functioning operates a progressing lever FA. This lever forms in its non-operated condition by its upper knee-shaped portion a support for a coin inserted into the coin box. When the lever is operated by the progressing magnet it is rocked in such manner that its upper part allows free passage for the coin, while its lower part occupies a sloping position and holds the fallen coin against one of the contacts A, B and C. As it appears from FIG. 1 the sloping of the lever is adjusted in such manner that each coin operates a contact belonging to the respective coin value. Thereby a distinct impedance element is inserted into the oscillating circuit, the capacitor C3 can be charged and a voice frequency oscillation corresponding to the coin value is transmitted through the line. The lever FA disconnects the contacts 4, 5 and consequently interrupts a current path between the capacitor C3 and the contacts P1–P0 so that no signal can be sent through the line by operation of the digit contacts.

The exchange comprises a coin signal receiver T*m* which can receive the voice frequency signals corresponding to the coin value and complete a circuit corresponding to the respective coin value in the exchange. The voice frequency signals can also consist of a combination of a number of signals but for the sake of simplicity it has been supposed that a certain voice frequency corresponding to a certain digit also represents a definite coin. When the called subscriber has answered, his current feeding relay R4 operates the relay R5. The latter operates the relay R1 which in turn connects the coin signal receiver T*m* to the line and operates the relay R2 which causes polarity reversal on the line. Said polarity reversal operates the progressing magnet FM so that the coin inserted will fall down and will cause transmission of a voice frequency corresponding to the value of the coin.

The coin box MT is provided with stepping forward means FS which has the object of preventing the progressing magnet FM to be operated on the first polarity reversal which is necessary in order to allow digit sending. Some embodiments of such stepping forward means will be described later on in detail. When the coin signal receiver T*m* has received the coin value signal, a circuit corresponding to the value of the coin is completed, for example the circuit A implying that the relay RA will be operated. The coin signal receiver Tm is thus a voice frequency receiver responsive to a definite frequency and able to control contact means upon receiving said definite frequency for indicating the kind of coin inserted when receiving a frequency associated with said kind of coin. Among the means well known to those skilled in the art far responding to a certain frequency by controlling contact means is a tuned circuit which allows current to pass sufficient to operate a magnetic relay only when the voice frequency to which it is tuned is received. The exchange comprises rotary selector means Vk which can be stepped forward along conducting segments by means of uniform current pulses so that during progressing by a definite number of steps a circuit is maintained closed through each of said segments. According to the embodiment shown the selector is provided with three segments Sa, Sb and Sc corresponding to the three types of coins and one of the relays RA–RC is maintained operative through its respective segment until the number of steps intended has been carried out by the wiper arm of the selector so that the arm has left the segment and the circuit has been interrupted. The segments have different lengths corresponding to the conversation time allowed in correspondence with the respective coin. The relay RA which has been assumed to be operated interrupts upon its operation the circuit of the relay R5 so that the coin signal receiver Tm is disconnected. Thereby also relay R2 will release and the line polarity will be plus again on the La-wire and minus on the Lb-wire. Relay RA is preparing a circuit for a buzzer through a contact located at the periphery of the selector in a point to which the wiper arm is coming one step before the step at which it leaves the segment Sa. Similar contacts along the periphery correspond to each segment.

At the same time as the circuit through, for example, relay RA is interrupted, a circuit is completed through the buzzer so that the calling subscribed receives a warning signal that the coin has been spent. Progressing of the selector is carried out by means of pulses which are supplied to the selector with equal time periods corresponding to a definite conversation length with a definite tariff. The length of the segments Sa, Sb, S is defined in such manner that the sum of said definite conversation lengths corresponds to the coin value belonging to the respective segment. Thus if a definite number of time periods has elapsed since the beginning of the conversation and the value of the coin has nearly been spent, i.e. at the last but one progressing pulse, the buzzer operates so that the subscriber knows a new coin has to be inserted. At the same time the relay RA releases, whereby on one hand the progressing pulses for the selector will cease, on the other hand a circuit for the restoring magnet RE of the selector will be completed through a home-position contact HL so that the selector is returned to the start position. The coin signal receiver is connected again and polarity reversal on the line is carried out so that the progressing device of the coin box will progress a new coin and the conversation can continue provided that a coin has been inserted into the coin box. If this has not been carried out, the connection will be interrupted within a definite time. The time periods between the progressing steps of the selector are defined in a manner known per se by the tariff of the conversation which depends on the number of the called subscriber.

In the drawing a pulse sender IG is shown diagrammatically, comprising a number of rotary cams which can close contacts with equal time periods depending on the tariff of the conversation. The contacts are operated by three relays RI, RII, RIII, one of which one operates corresponding to the number registered in the register. As shown diagrammatically the register has terminals which are marked by plus corresponding to the digits in the subscriber's number called. Said terminals are combined in such manner through so-called "and"-circuits allowing passage of current when all the inputs are plus-marked so that with definite digit combinations definite current paths are obtained and one of the relays RI–RIII receives current whereby the length of the time periods will be defined. The pulses can of course be produced in some other arbitrary manner and the solution described is only shown in order to explain the invention.

FIG. 2 shows the principle of a stepping forward device FS arranged in the coin box, for preventing operation of the progressing magnet FM on polarity reversal necessary for digit sending if the progressing magnet is operated by polarity reversal. The stepping forward device consists substantially of two mercury switches S1, S2 and of three magnets Z1, Z2 and Z3, the coils of which are connected in series with rectifiers. When the first reversal is carried out on the line, a current can pass through the rectifier Li1 to the magnet winding Z1 connected in series with the latter. The magnet Z1 operates and rocks the switch S1 from the position a to the position b designated by dashed lines in which position it connects the magnet winding Z2 to the line. As long as the polarity reversal on the line is maintained, no current can however pass through the winding Z2 so that the magnet does not operate. When the polarity reversal ceases, Z2 is magnetized and it rocks the switch S2 from the position a to the position b whereby the magnet winding Z3 is connected to the line. The magnet Z3 can however not operate as Li3 is blocking for this current direction. On the next polarity reversal which is produced by the coin signal receiver in the exchange, Z3 is operating which latter corresponds to the progressing magnet FM shown in FIG. 1. Consequently the progressing lever FA is operated and the coin causes contact as earlier described. Z3 has simultaneously restored the switch S1 to the position a. Restoring of the switch S2 is carried out mechanically when replacing the handset, by means of the cradle contact Ka rocking the crank lever Kb which in turn restores the switch to its original position and the instrument is ready for the next call.

FIG. 3 shows another stepping forward device having the purpose of preventing the function of the progressing magnet on the first polarity reversal. The progressing arm FA is provided with a transversal lever d which can be rocked relatively to the lever FA by means of the stepping forward magnet Z3. Each time the magnet operates, the lever d is rocked notwithstanding which number of sequence the polarity has which causes the operation. The progressing lever does not follow however at the first but only at the second rocking. At the end of the transversal lever d, remote from the magnet Z3 an arc-shaped member b is movably arranged, the curvature of which corresponds to the curvature of the outer surface of a projection e arranged on the progressing arm FA. As long as the handset rests on the cradle the member c which is pressed against the arc-shaped member prevents rocking of the latter. When the cradle K is lifted, the member c will be removed from the arc-shaped part b which is however still prevented from rocking as it is maintained by the hook a. When the progressing magnet is operated at the first time, the arc-shaped part b engages the outer surface of the hook a so that it can pass along the surface of the projection e on rocking of the transversal arm d without affecting the projection. During this movement the hook a will be released and rocked by the spring h so that when member b after the releasing of the magnet returns to its starting position, the member b will be rocked by a spring j around the end point of the transversal lever d to the position shown by dashed lines. If the magnet Z3 is operated again, the member d can not pass the projection e but pushes against the latter causing rocking of the progressing arm FA so that the coin is progressed in a manner described before. When replacing the cradle the member b is rocked around the end point of the transversal lever against the tension of the spring j by means of member *c*, the end of the arc-shaped part slides along the sloping surface *k* of the hook *a* and the device is restored to starting position.

The stepping forward device can have any other arbitrary construction and the embodiments described have only the object of elucidating the principle of the invention.

We claim:

1. In an arrangement for signaling to a control device in an automatic telephone exchange the values of different kinds of coins inserted in the coin box of a pay station telephone instrument comprising digit contacts for dialing and at least one voice frequency generator for sending voice frequency A.-C. signals to the exchange and including an oscillating circuit having a basic frequency controlling the generated frequency and several impedance means of different impedance value connectable to the oscillating circuit by operation of said digit contacts during dialing to generate different and distinct frequencies due to a change of the basic frequency upon connection of an impedance means, a plurality of coin contacts in said coin box one for each kind of coins and each being operable by the respective kind of coin, each of said coin contacts being connected in circuit with one of said impedance means for connecting the respective impedance means to the oscillating circuit by operation of the corresponding coin contact upon insertion of the respective kind of coin for transmitting to the exchange a signal indicative of the inserted kind of coin, the improvement comprising means for guiding an inserted coin into engagement with the coin contact for the respective kind of coin, a voice frequency receiver in said exchange responsive to a definite frequency and able to control contact means upon receiving said definite frequency for indicating the kind of coin inserted when receiving a frequency associated with said kind of coin, means in the exchange for energizing said guide means through a connection existing between the calling subscriber with the exchange and for energizing said voice frequency receiver, respectively, when the called subscriber answers, said guide means including means controlling the insertion of a coin to prevent operation of coin contacts during transmission of digit signals and to prevent operation of digit contacts during transmission of coin value signals, respectively, and means with a stepping forward device responsive to polarity reversal of the current in said line for energizing said guide means upon completion of a predetermined number of steps following the beginning of a call from the telephone instrument.

2. Arrangement according to claim 1 including coin value marking circuits, one for each kind of coin, each of said marking circuits being energized by the signal indicative of the respective kind of coin, time unit means for setting a time value for each respective denomination of coin, and comparing circuit means for comparing the value of an inserted coin and said time value set for the respective coin, said comparing circuit means being connected in circuit with said marking circuits for feeding to the comparing circuit means a signal from the energized marking circuit.

3. Arrangement according to claim 1 wherein said stepping forward device comprises a plurality of control circuits, one for each step, each of said control circuits being energized in turn in response to a step due to a polarity reversal and preparing the control circuit for the next following step, and an electromagnetic means for operating said guide means included in one of said control circuits for energization of said electromagnetic means upon energization of the respective control circuit.

4. Arrangement according to claim 1 wherein said stepping forward device comprises a stepping means including a coupling linkage and an electromagnetic means having a movable armature, said electromagnetic means being controlled by a polarity reversal in said D.-C. line to cause stepping of said stepping means and to couple said armature with a progressing arm upon completion of a predetermined number of steps, said coupling between the armature and the progressing arm effecting operation of the guide means.

References Cited in the file of this patent

UNITED STATES PATENTS

| | | |
|---|---|---|
| 1,386,701 | Goodrum | Aug. 9, 1921 |
| 2,020,466 | Hatton et al. | Nov. 12, 1935 |
| 2,082,561 | Appelius | June 1, 1937 |
| 2,251,301 | Sobotta | Aug. 5, 1941 |
| 2,623,950 | Ungar | Dec. 30, 1952 |
| 2,676,209 | Joel | Apr. 20, 1954 |
| 2,681,386 | Davison et al. | June 15, 1954 |
| 2,732,432 | Hullegard | Jan. 24, 1956 |
| 2,817,709 | Alexandersson | Dec. 24, 1957 |
| 2,819,343 | Faulkner | Jan. 7, 1958 |
| 2,909,609 | Svala | Oct. 20, 1959 |